US007962384B2

(12) United States Patent
Arena et al.

(10) Patent No.: US 7,962,384 B2
(45) Date of Patent: Jun. 14, 2011

(54) SYSTEM, METHOD, AND COMPUTER PROGRAM PRODUCT FOR ALLOCATING ASSETS AMONG A PLURALITY OF INVESTMENTS TO GUARANTEE A PREDETERMINED VALUE AT THE END OF A PREDETERMINED TIME PERIOD

(75) Inventors: Robert Arena, Farmington, CT (US); Robert O'Donnell, Harwinton, CT (US); Robert Schwartz, West Granby, CT (US); N. David Kuperstock, Woodbridge, CT (US); Tim Paris, Guilford, CT (US); Robert Leach, Weston, CT (US); Jacob Herschler, Southport, CT (US); Mike Morell, Shelton, CT (US); Fiona Jackman-Ward, Stratford, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 2544 days.

(21) Appl. No.: 10/122,942

(22) Filed: Apr. 12, 2002

(65) Prior Publication Data
US 2002/0174042 A1 Nov. 21, 2002

Related U.S. Application Data

(60) Provisional application No. 60/283,715, filed on Apr. 13, 2001.

(51) Int. Cl.
*G06Q 99/00* (2006.01)
(52) U.S. Cl. ........................................................ 705/35
(58) Field of Classification Search ............... 705/35–37
See application file for complete search history.

(56) References Cited

U.S. PATENT DOCUMENTS

| 5,126,936 | A | * | 6/1992 | Champion et al. | 705/36 R |
| 5,148,365 | A | * | 9/1992 | Dembo | 705/36 R |
| 5,631,828 | A | | 5/1997 | Hagan | |
| 5,812,987 | A | | 9/1998 | Luskin et al. | |
| 5,933,815 | A | | 8/1999 | Golden | |
| 6,219,650 | B1 | | 4/2001 | Friend et al. | |
| 6,278,983 | B1 | | 8/2001 | Ball | |
| 6,282,520 | B1 | * | 8/2001 | Schirripa | 705/36 R |
| 6,360,210 | B1 | * | 3/2002 | Wallman | 705/36 R |
| 6,611,815 | B1 | | 8/2003 | Lewis et al. | |
| 6,615,188 | B1 | * | 9/2003 | Breen et al. | 705/37 |
| 7,062,458 | B2 | * | 6/2006 | Maggioncalda et al. | 705/36 R |
| 7,174,313 | B1 | * | 2/2007 | Martinez | 705/36 R |

(Continued)

OTHER PUBLICATIONS

Michael J. Brennan & Eduardo S. Schwartz, "Time-Invariant Portfolio Insurance Strategies", Jun. 1988, Journal of Finance, vol. XLIII No. 2, p. 283.*

(Continued)

*Primary Examiner* — Thomas M Hammond, III
(74) *Attorney, Agent, or Firm* — Baker Botts L.L.P.

(57) ABSTRACT

A system, method, and computer program product for allocating assets among a plurality of investments to guarantee a predetermined value at the end of a predetermined time period. A computer program controls the allocation of assets in the investment vehicle, which allows the investor to initially invest one hundred percent of the initial deposit in non-secure, high risk investments. At the end of the each trading day, the computer program determines if assets should be reallocated from the non-secure investments to the secure investments, from the secure investments to the non-secure investments, or if no reallocation is necessary.

30 Claims, 5 Drawing Sheets

U.S. PATENT DOCUMENTS

2002/0174046 A1* 11/2002 Mistretta .................... 705/36

OTHER PUBLICATIONS

ING Get Fund Mar. 1, 2001.*

U.S. Appl. No. US 2001/0014873; Publication Date Aug. 16, 2001; Henderson et al.

Jacob M. Herschler et. al., "System and Method for Providing a Financial Instrument with an Asset Transfer Feature," U.S. Appl. No. 11/671,598, pending, 89 pages, filed Feb. 6, 2007.

Jacob M. Herschler et. al., "System and Method for Providing a Financial Instrument Utilizing a Liability Ratio," U.S. Appl. No. 11/371,625, pending, 77 pages, filed Feb. 6, 2007.

Jacob M. Herschler et. al., "System and Method for Providing a Financial Instrument with a Periodic Step-Up Feature," U.S. Appl. No. 11/671,679, pending, 73 pages, filed Feb. 6, 2007.

ING Get Fund Series M Prospectus (Form 497: Definitive materials filed by investment companies); http://access.edgar-online.com; Copyright 2010; 29 pages, filed Mar. 1, 2001.

* cited by examiner

Contract Specs (A)

| | |
|---|---|
| Program Inception: | 06/17/2001 |
| Program Maturity: | 06/17/2008 |
| Guaranteed Acct Value: | $250,000.00 |

Initial Conditions (E)

| | |
|---|---|
| Today's Date: | 09/25/2002 |
| # of Variable Accounts: | 3 |
| # of Fixed Accounts: | 1 |
| Variable Account Value: | $102,437.05 |
| Fixed Account Value: | $130,000.00 |
| Account Value: | $232,437.05 |

Guarantee Rates (B)

| Maturity (yrs) | Today's Rate | Tomorrow's Rate |
|---|---|---|
| 1 year | 4.30% | 4.30% |
| 2 years | 4.45% | 4.45% |
| 3 years | 4.65% | 4.65% |
| 4 years | 4.67% | 4.67% |
| 5 years | 5.00% | 5.00% |
| 6 years | 5.01% | 5.01% |
| 7 years | 5.07% | 5.07% |

| | |
|---|---|
| Initial Cushion | 8.15% |
| Trading Action | LIQUIDATE FIXED |
| MVA | $1,049.71 |
| Final Cushion | 25.00% |

Trading Parameters (D)

| | |
|---|---|
| minimum D | 20% |
| middle D | 25% |
| maximum D | 30% |
| min eq. pct. | 2% |
| Today's TTM | 5,7815 |
| Tomor's TTM | 5,7288 |
| Today's Rate | 5.01% |
| Tomor's Rate | 5.01% |

(F)

| | |
|---|---|
| Final Var AV | $ 180,881.67 |
| Final Fixed AV | $ 52,575.09 |
| Final Total AV | $ 233,456.76 |
| Double Check (shortage?) | $ 249,999.99 FALSE |

Variable Accounts - Before Trading (H)

| Fund | # of Units | Price | Value | Current Value | Future Value |
|---|---|---|---|---|---|
| JanCap | 2,955.42 | $ 23.00 | $ 67,974.66 | $ 130,000.00 | $ 174,304.86 |
| Alliance G&I | 2,417.44 | $ 11.67 | $ 28,211.52 | $ - | $ - |
| Federated HY | 503.29 | $ 12.42 | $ 6,250.86 | $ - | $ - |
| | | $ - | $ - | $ - | $ - |
| | | $ - | $ - | $ - | $ - |

Variable Accounts - After Trading (G)

| Fund | # of Units | Price | Value |
|---|---|---|---|
| JanCap | 5,218.63 | $ 23.00 | $ 120,028.55 |
| Alliance G&I | 4,268.68 | $ 11.67 | $ 49,816.45 |
| Federated HY | 888.70 | $ 12.42 | $ 11,037.67 |
| | | $ - | $ - |
| | | $ - | $ - |

Fixed Accounts - Before Trading (J)

| Purchase Date | Rate | Maturity Date | Current Value | Future Value |
|---|---|---|---|---|
| 03/04/2002 | 5.25% | 06/17/2008 | $ 130,000.00 | $ 174,304.86 |
| | | 06/17/2008 | $ - | $ - |
| | | 06/17/2008 | $ - | $ - |
| | | 06/17/2008 | $ - | $ - |

Fixed Accounts - After Trading (K)

| Purchase Date | Rate | Maturity Date | Current Value | Future Value |
|---|---|---|---|---|
| 03/04/2002 | 5.25% | 06/17/2008 | $ 52,575.09 | $ 70,493.02 |
| | | 06/17/2008 | $ - | $ - |
| | | 06/17/2008 | $ - | $ - |
| | | 06/17/2008 | $ - | $ - |

Fig. 3

| Contract Specs | | | | A | | Guarantee Rates | | | B | Trading Parameters | | C | | D |
|---|---|---|---|---|---|---|---|---|---|---|---|---|---|---|
| Program Inception: | | 06/17/2001 | | | | Maturity (yrs) | Today's Rate | Tomorrow's Rate | | minimum D | | | | 20% |
| Program Maturity: | | 06/17/2008 | | | | 1 year | 4.30% | 4.30% | | middle D | | | | 25% |
| Guaranteed Acct Value: | | $275,000.00 | | | | 2 years | 4.45% | 4.45% | | maximum D | | | | 30% |
| | | | | | | 3 years | 4.65% | 4.65% | | min eq. pct. | | | | 2% |
| Initial Conditions | | | | E | | 4 years | 4.67% | 4.67% | | Today's TTM | | | F | |
| Today's Date: | | 09/25/2002 | | | | 5 years | 5.00% | 5.00% | | Tomor's TTM | | | | |
| # of Variable Accounts: | | 3 | | | | 6 years | 5.01% | 5.01% | | Today's Rate | | | | |
| # of Fixed Accounts: | | 1 | | | | 7 years | 5.07% | 5.07% | | Tomor's Rate | | | | |
| Variable Account Value: | | $102,437.05 | | | | Initial Cushion | | | | Final Var AV | | $ 102,437.04 | G | |
| Fixed Account Value: | | $130,000.00 | | | | Trading Action | | DO NOTHING | | Final Fixed AV | | $ 130,000.00 | | |
| Account Value: | | $232,437.05 | | | | MVA | | | | Final Total AV | | $ 232,437.04 | | |
| | | | | | | Final Cushion | | | | Double Check (shortage?) | | $ 274,999.99 FALSE | | |

| Variable Accounts - Before Trading | | | | | | | H | Variable Accounts - After Trading | | | | | I | |
|---|---|---|---|---|---|---|---|---|---|---|---|---|---|---|
| Fund | # of Units | | Price | | Value | | | Fund | # of Units | | Price | | Value | |
| JanCap | 2,955.42 | $ | 23.00 | $ | 67,974.66 | | | JanCap | 2,955.42 | $ | 23.00 | $ | 67,974.66 | |
| Alliance G&I | 2,417.44 | $ | 11.67 | $ | 28,211.52 | | | Alliance G&I | 2,417.44 | $ | 11.67 | $ | 28,211.52 | |
| Federated HY | 503.29 | $ | 12.42 | $ | 6,250.86 | | | Federated HY | 503.29 | $ | 12.42 | $ | 6,250.86 | |
| | | $ | - | $ | - | | | | | $ | - | $ | - | |
| | | $ | - | $ | - | | | | | $ | - | $ | - | |
| | | $ | - | $ | - | | | | | $ | - | $ | - | |

| Fixed Accounts - Before Trading | | | | | | | J | Fixed Accounts - After Trading | | | | | K | |
|---|---|---|---|---|---|---|---|---|---|---|---|---|---|---|
| Purchase Date | Rate | Maturity Date | | Current Value | | Future Value | | Purchase Date | Rate | Maturity Date | | Current Value | | Future Value |
| 03/04/2002 | 5.25% | 06/17/2008 | $ | 130,000.00 | $ | 174,304.86 | | 03/04/2002 | 5.25% | 06/17/2008 | $ | 130,000.00 | $ | 174,304.86 |
| | | 06/17/2008 | $ | - | $ | - | | | | 06/17/2008 | $ | - | $ | - |
| | | 06/17/2008 | $ | - | $ | - | | | | 06/17/2008 | $ | - | $ | - |
| | | 06/17/2008 | $ | - | $ | - | | | | 06/17/2008 | $ | - | $ | - |

Fig. 4

| Contract Specs | | | | A | | Guarantee Rates | | | C | Trading Parameters | | D |
|---|---|---|---|---|---|---|---|---|---|---|---|---|
| Program Inception: | | 06/17/2001 | | | | Maturity (yrs) | Today's Rate | Tomorrow's Rate | | minimum D | | 20% |
| Program Maturity: | | 06/17/2008 | | | | 1 year | 4.30% | 4.30% | | middle D | | 25% |
| Guaranteed Acct Value: | | $300,000.00 | | | | 2 years | 4.45% | 4.45% | | maximum D | | 30% |
| | | | | | | 3 years | 4.65% | 4.65% | | min eq. pct. | | 2% |
| Initial Conditions | | | | E | | 4 years | 4.67% | 4.67% | | Today's TTM | | |
| | | | | | | 5 years | 5.00% | 5.00% | | Tomor's TTM | F | |
| Today's Date: | | 09/25/2002 | | | | 6 years | 5.01% | 5.01% | | Today's Rate | | |
| # of Variable Accounts: | | 3 | | | | 7 years | 5.07% | 5.07% | | Tomor's Rate | | |
| # of Fixed Accounts: | | 1 | | | | | | | | | | |
| Variable Account Value: | | $102,437.05 | | | | Initial Cushion | | | G | Final Var AV | $ | 29,813.89 |
| Fixed Account Value: | | $130,000.00 | | | | Trading Action | | MOVE INTO FIXED | | Final Fixed AV | $ | 202,623.16 |
| Account Value: | | $232,437.05 | | | | MVA | | $ | | Final Total AV | $ | 232,437.05 |
| | | | | | | Final Cushion | | | | Double Check (shortage?) | $ | 300,000.00 |
| | | | | | | | | | | | | FALSE |

| Variable Accounts - Before Trading | | | | | | Variable Accounts - After Trading | | | H | | | |
|---|---|---|---|---|---|---|---|---|---|---|---|---|
| Fund | # of Units | Price | | Value | | Fund | # of Units | Price | | Value | | |
| JanCap | 2,955.42 | $ 23.00 | $ | 67,974.66 | | JanCap | 860.16 | $ 23.00 | $ | | | |
| Alliance G&I | 2,417.44 | $ 11.67 | $ | 28,211.52 | | Alliance G&I | 703.59 | $ 11.67 | $ | | | |
| Federated HY | 503.29 | $ 12.42 | $ | 6,250.86 | | Federated HY | 146.48 | $ 12.42 | $ | | | |
| | | $ | $ | - | | | | $ - | $ | | | |
| | | $ | $ | - | | | | $ - | $ | | | |
| | | $ | $ | - | | | | $ - | $ | | | |

| Fixed Accounts - Before Trading | | | | | | | Fixed Accounts - After Trading | | | | | |
|---|---|---|---|---|---|---|---|---|---|---|---|---|
| Purchase Date | Rate | Maturity Date | Current Value | Future Value | | | Purchase Date | Rate | Maturity Date | Current Value | | Future Value |
| 03/04/2002 | 5.25% | 06/17/2008 | $ 130,000.00 | $ 174,304.86 | | | | 5.25% | 06/17/2008 | $ | $ | 174,304.86 |
| | | 06/17/2008 | $ - | $ - | | | 09/25/2002 | 5.01% | 06/17/2008 | $ | $ | 96,107.84 |
| | | 06/17/2008 | $ - | $ - | | | | | 06/17/2008 | $ | $ | - |
| | | 06/17/2008 | $ - | $ - | | | | | 06/17/2008 | $ | $ | - |

Fig. 5

SYSTEM, METHOD, AND COMPUTER PROGRAM PRODUCT FOR ALLOCATING ASSETS AMONG A PLURALITY OF INVESTMENTS TO GUARANTEE A PREDETERMINED VALUE AT THE END OF A PREDETERMINED TIME PERIOD

CROSS REFERENCE TO RELATED APPLICATION

This non-provisional application claims the benefit of the earlier filing date of, and contains subject matter related to that disclosed in, U.S. Provisional Application Ser. No. 60/283,715, filed Apr. 13, 2001 having common inventorship, the entire contents of which are incorporated herein by reference.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office, but otherwise reserves all copyright rights.

COMPUTER PROGRAM LISTING APPENDIX

A computer program listing appendix is included with this application and the entire contents of the computer program listing appendix is incorporated herein by reference.

BACKGROUND OF THE INVENTION

1. Field of the Invention

The present invention relates, generally, to the field of investment management and, more particularly, to a system, method, and computer program product for allocating assets among a plurality of investments to guarantee a predetermined value at the end of a predetermined time period.

2. Discussion of the Background

Presently, there is a wide array of investments that investors may use to achieve their investment goals. As is well known in the investment industry, each investment has its own advantages and disadvantages, including an associated anticipated rate of return and risk. Typically, an investment with a high anticipated rate of return also has a high risk of depreciating. For example, while some stocks may provide very high rates of return, they also involve substantial risk that the investor could lose part or all of the initial investment. Well-known examples of high risk investments include stocks (especially technology stocks) and mutual funds (especially growth-oriented funds). Conversely, an investment that is low risk, typically has an anticipated rate of return that is relatively low. Examples of lower risk investments include insured savings accounts, Certificate of Deposits (CDs), government backed bonds, and money market accounts.

Traditionally, investors have had to choose between a higher rate of return (selecting a high yield, high risk investment) and safety of principal (selecting a low risk, low yield investment). In seeking a moderately high rate of return while attempting to protect against significant downturns in the market, investors often diversify—allocating their assets among higher risk, higher yield investments (hereinafter referred to as "high yield investments") and lower risk, lower yield investments (hereinafter referred to as "low risk investments"). The investor's assets are allocated between the high yield and low risk investments according to the investor's risk tolerance and investment goals.

While diversifying in this fashion may lower the risk of significant downturns in the value of the investment portfolio, it also tends to reduce the potential for appreciation. Diversification tends to lower the downside risk by reducing the depreciation that may result in the total value of the investor's assets if the high yield investment yields a negative return (i.e., experiences a reduction in value). However, diversifying can also result in limited potential for appreciation. Specifically, if the high yield investment produces a high rate of return on the assets allocated therein—as is anticipated and intended—the increase in the overall value of the investor's assets will be diminished by the relatively low increase in value of the low risk investment. For example, if half of an investor's assets are allocated to a high yield investment that yields a fifty percent rate of return, and the other half of the investor's assets are allocated to a low risk investment that yields a zero percent return, the overall rate of return on the investor's assets will be twenty-five percent. Thus, while diversifying may increase the overall security of the investor's investment portfolio, diversifying may also reduce the overall rate of return.

Financial institutions have also created various investment vehicles designed to reduce or eliminate risk, while minimizing the performance dampening effect of the diversification. However, these vehicles typically place restrictions on the investment and/or investor and also include other undesirable features.

Zero coupon instruments, certificates of deposit, guaranteed investment contracts and variations on these types of instruments comprise one type of such an investment vehicle. With this type of instrument, a financial institution guarantees that if the principal contribution is maintained without withdrawals or transfers until the specified date, the investment will be worth a predetermined value at the end of the period. The financial institution invests a pool of investments standing behind the obligations to every investor, be it individuals or institutions, as it sees fit, subject to applicable regulatory standards, to support its guarantee. Typically, these types of investment do not yield greater returns than the predetermined value at the end of the predetermined time period and are often a fixed rate investment. In addition, the investor usually has no say in the selection of investments and, once the assets are allocated, the investor has no control to reallocate them.

Individualized guaranteed portfolios are another type of such program. With this type of instrument, a financial institution negotiates with an investor—generally an institutional investor—over the range of investments that may be used in a portfolio underlying a guarantee of some predetermined value at the end of the predetermined period. In such a negotiation, the predetermined value and the length of the period, as well as the ratings of the issuers of the underlying securities, may all be part of the negotiation. If the predetermined value is not accumulated at the end of the predetermined time period, the financial institution supplies the shortfall. However, the financial institution taking on the guarantee then maintains control over the investment of the portfolio once the period begins, within the parameters set out in the negotiation. Thus, the investor has limited selection of investments and, once the assets are allocated, the investor has no control to reallocate them.

A guaranteed return pooled investment is still another type of such program. These instruments generally are offered by investment companies, and typically comprise a particular investment such as a mutual fund with a limited "offering period" (the period within which an investment must be made) and a set calendar date, which is the date the predetermined value is guaranteed for each shareholder. The investor has no control over the selection of investments and once the assets are allocated, the investor has no control to reallocate them. In summary, the prior art products impose restrictions on the investments available for initial allocations, restrict or prohibit reallocations, and often have a relatively low anticipated rate of return.

Therefore, notwithstanding the available investment diversification products, there is a need for a system, method, and computer program product for allocating assets among a plurality of investments that, unlike such conventional diversification products: (1) guarantees a predetermined value or rate of return on an investment at the end of a predetermined time period; (2) has a guaranteed rate of return over a predetermined time period, without the reduction in the appreciation normally associated with diversification; (3) allows for diversification between a Secure Account and a Variable Account to guarantee a predetermined value at the end of a predetermined time period and to increase the investor's overall security of the portfolio; (4) provides significant investment control to the investor with flexibility in the type of investments available to the investor throughout the time period of the investment; and (5) does not have a fixed asset allocation requirement.

SUMMARY OF THE INVENTION

The primary object of the present invention is to overcome the deficiencies of the prior art by providing a system, method, and computer program product for allocating assets among a plurality of investments to guarantee a predetermined value at the end of a predetermined time period.

Another object of the present invention is to provide a system, method, and computer program product for controlling an investment vehicle that guarantees a rate of return on an investment after a predetermined time period.

Yet another object of the present invention is to provide a system, method, and computer program product for allocating assets between a Secure Account and a Variable Account to ensure a predetermined value at the end of a predetermined time period.

Still another object of the present invention is to provide a system, method, and computer program product for controlling an investment vehicle that guarantees return of the initial investment after a predetermined time period.

Another object of the present invention is to provide a system, method, and computer program product for controlling an investment vehicle that guarantees a predetermined value at the end of a predetermined time and permits significant investment control to the investor with flexibility in the type of investments available to the investor throughout the time period of the investment.

Yet another object of the present invention is to provide a system, method, and computer program product that controls allocation of assets of an investment vehicle having a guaranteed rate of return over a predetermined time period and without the reduction in the appreciation normally associated with diversification.

Another object of the present invention is to provide a system, method, and computer program product for allocating assets among a plurality of investments to guarantee a predetermined value at the end of a predetermined time period without any initial fixed asset allocation requirement.

The present invention achieves these objects and others by providing a system, method, and computer program product for allocating assets among a plurality of investments to guarantee a predetermined value at the end of a predetermined time period, the system comprising a processor, a memory, and a computer program stored in the memory. The computer program controls the allocation of assets in an investment vehicle, thereby allowing the investor to initially invest up to one hundred percent (100%) of the principal in non-secure, high risk investments, such as, for example, in mutual funds and/or stocks. At the end of each trading day, the computer program determines if assets should be reallocated from the non-secure investments to the secure investments, from the secure investments to the non-secure investments, or if no reallocation is necessary.

The computer program will reallocate assets from the non-secure investment(s) to the secure investment(s) if, at the end of a trading day, the computer program determines that the guaranteed account value would not be met if the non-secure investments were to experience a first predetermined depreciation (e.g., twenty percent) during the next trading day and all of the depreciated assets of the non-secure investments were reallocated to the secure investments for the remainder of the predetermined time period. Alternately, the computer program will reallocate assets from the secure investments to the non-secure investments if the computer program determines that the guaranteed account value would still be met even if the non-secure investments were to experience a second predetermined depreciation (e.g., thirty percent) during the next trading day and all of the depreciated assets of the non-secure investments were reallocated to the secure investment for the remainder of the predetermined time period. If neither of these conditions is met, then the computer program does not reallocate assets.

If reallocation is necessary, the computer program reallocates the assets so that the investment account value will equal the guaranteed account value at the end of the predetermined time period if the non-secure investments were to experience a third predetermined depreciation (a value between the first and second predetermined depreciations) on the next trading day and all of the depreciated assets of the non-secure investments were reallocated to a secure investment for the remainder of the predetermined time period.

In contrast to traditional diversification, no portion of the investor's initial investment need be initially placed in a secure investment yielding a low rate of return to guarantee the guaranteed account value. In addition, if the non-secure investments perform well—providing a rate of return that is at least equal to the rate of return of the Secure Account investment and with moderate volatility—assets may never need to be reallocated from the non-secure investments to the secure investments. Thus, if the non-secure investments perform well, the aggregate rate of return of the investment account is not diminished by the low rates of return associated with the secure investment.

Further features and advantages of the present invention, as well as the structure and operation of various embodiments of the present invention, are described in detail below with reference to the accompanying drawings.

BRIEF DESCRIPTION OF THE DRAWINGS

The accompanying drawings and source code, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein:

FIG. 5 is an illustration of a third set of sample data input, output, and processed by the system, method, and computer program product of the present invention.

DETAILED DESCRIPTION OF THE PREFERRED EMBODIMENTS

In the following description, for purposes of explanation and not limitation, specific details are set forth, such as particular networks, systems, computers, terminals, devices, components, techniques, software products and systems, enterprise applications, operating systems, financial equations, financial formulas, financial algorithms, hardware, etc. in order to provide a thorough understanding of the present invention. However, it will be apparent to one skilled in the art that the present invention may be practiced in other embodiments that depart from these specific details. Detailed descriptions of well-known networks, systems, computers, terminals, devices, components, techniques, software products and systems, enterprise applications, operating systems, financial equations, financial formulas, financial algorithms, hardware are omitted so as not to obscure the description of the present invention.

I. General Design Concepts

The present invention is designed, in general terms, to guarantee a predetermined value at the end of a predetermined time period. However, it is equally accurate to characterize the design of the system, method, and computer program product of the present invention as being designed to guarantee a minimum rate of return over the predetermined time period. In the example below, the investment account is guaranteed to have a value equal to or greater than the investor's initial investment at the end of the predetermined time period. However, it is equally accurate to characterize the investment as guaranteeing at least a zero percent return on the investment. Likewise, if the investment is designed to guarantee a future value that is greater than the initial investment, it would therefore also be guaranteeing an associated rate of return that corresponds to the increase in value over the guaranteed time period.

A. Secure and Non-Secure Investments

The present invention is designed to control the allocation of assets between at least one secure investment and at least one non-secure investment—the non-secure investment preferably having a higher anticipated rate of return, and therefore more risk, than the secure investment. Secure investments may include, for example, cash, certificate of deposits, money market investments, Treasury Bills, some bonds, insurance company fixed-rate annuities, and other similar low risk investments. The secure investment should have a minimum future value (i.e., provide a minimum rate of return) that can be approximated, and preferably, calculated definitively if held until the end of its expected holding period. The secure investment may provide a rate of return that is positive, zero, or even slightly negative.

Non-secure investments have a higher anticipated rate of return than secure investments, and may include, for example, stocks, mutual funds, real estate, commodities, foreign exchange contracts, exchange traded futures and options, as well as contractual assets or liabilities, such as reinsurance contracts or interest-rate swaps, various derivatives instruments, or any other high risk investment or venture.

The system, method, and computer program product of the present invention is designed, in one embodiment, to manage the investment accounts for a plurality of investors. However, in an alternate embodiment, the system, method, and computer program product of the present invention is also designed to manage the investments of a single investor and, therefore, could, advantageously, be designed to operate on a desktop computer under, for example, the Microsoft Windows® operating system or other suitable operating system.

B. The Time Based Value of Assets

The time based value of assets is a concept used throughout the description of the present invention. As is well-known, assets invested at a known rate of return will have a future value that is based on the initial investment, the rate of return, and the duration of the investment. The future value of such an investment may be calculated by the following equation:

$$FV=PV*(1+\text{Rate})^N$$

where:
FV=the future value of the investment;
PV=the present value of the investment;
Rate=the interest rate for each compounding time period (e.g., each year or month); and
N=the number of compounding time periods.

The "$(1+\text{Rate})^N$" portion of the above equation is referred to as the "accumulating interest factor" in the description provided below.

Figure 1:
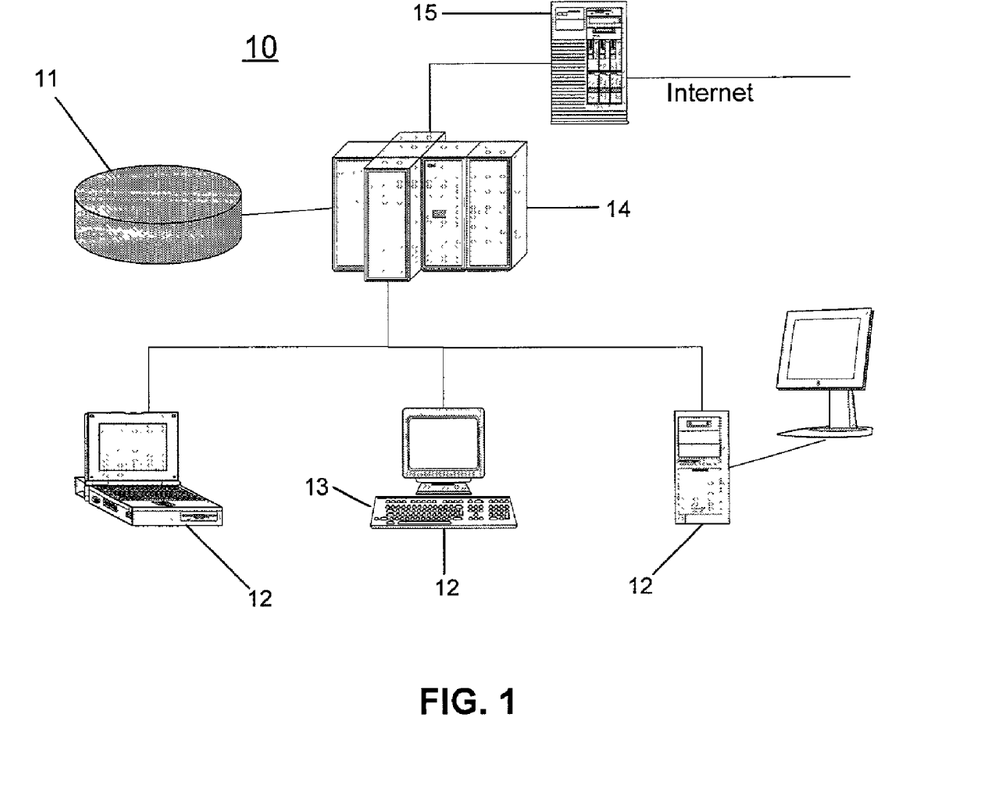
FIG. 1 is an illustration of a representative computer system for implementing the system, method, and computer program product of the present invention for allocating assets among a plurality of investments to guarantee a predetermined value at the end of a predetermined time period.

II. Structure and Operation of System, Method, and Computer Program Product of the Present Invention A. System Hardware FIG. 1 is an illustration of a representative computer system for implementing the system, method, and computer program product of the present invention for allocating assets among a plurality of investments to guarantee a predetermined value at the end of a predetermined time period. With reference to FIG. 1, as described above, the asset allocation process of the present invention may be advantageously implemented using a computer program executing on a computer system 10 having a processor or central processing unit 14, such as, for example, an IBM AS/400, having a memory 11, such as, for example, a hard drive, RAM, ROM, a compact disc, magneto-optical storage device, and/or fixed or removable media, having a one or more user interface devices 12, such as, for example, computer terminals, personal computers, laptop computers, and/or handheld devices, with an input means, such as, for example, a keyboard 13, mouse, pointing device, and/or microphone. The computer program is stored in memory 11 along with various other data including investor information, investment data, account information, investor Step Ups, asset information, allocation of investor assets, transaction cost data, fee data, communication information, and other parameters and data necessary to implement the method of the present invention.

In addition, the computer system 10 is coupled to a computer network, which may also be communicatively coupled to the Internet and/or other computer network to facilitate the buying and selling of investments electronically through an electronic communications network (ECN) such as, for example, Island (ISLD); Instinet (INCA); Terranova (TNTO); Attmin (ATTN); Bloomberg Tradebook (BTRD); Spear, Leads, & Kellogg (REDI); and NASDAQ.

Optionally, information and other data including investor information, investment data, account information, investor Step Ups, asset information, allocation of investor assets, transaction cost data, fee data, communication information, and other parameters and data necessary to implement the method of the present invention could be stored externally of the system 10 and received through the Internet or other communication network in a manner well-known in the art for processing by the system 10. Also, the system software for implementing the method of the present invention could be implemented, wholly or partly, on a personal computer, laptop computer, handheld device, or like communication device or appliance for performing some or all of the asset allocation, reallocating, and transaction processing steps of the present invention. The computer system 10 of the present invention may also include a web server 15.

B. System Software

As discussed, the computer program of the present invention allocates assets among a plurality of investments to guarantee a minimum total account value at the end of a predetermined time period. The following is a description of one example embodiment of a computer program with various software modules for implementing the system and method of the present invention. The present invention and, more particularly, the computer program and software modules could be implemented in a variety of ways, and the manner in which the program and modules are implemented is largely a matter of design choice well within the ordinary skill level of those skilled in this art.

Throughout this description the minimum total account value guaranteed by the investment at the end of the time period will be referred to as the guaranteed account value or GAV. In the example embodiment provided below, the assets in the investment account are allocated between two accounts—a Secure Account holding the secure investments and a Variable Account holding the non-secure investments. In this example embodiment, the Secure Account includes only one investment vehicle. As discussed above, the investments available to the Secure Account are secure investments with a minimum guaranteed rate of return over the predetermined time period.

The Variable Account may include a single investment or a number of investments over which the investor may elect to allocate assets. The investments available in the Variable Account have a higher anticipated rate of return and a higher risk than the investments available to the Secure Account.

In this example embodiment, the investment guarantees a minimum total account value equal to the investor's initial investment (the principal) at the end of a predetermined time period of seven years. In other words, the investor is guaranteed the return of the investor's principal after expiration of seven years and is, therefore, assured that there will be no decrease in value of the investment. Thus, this example ensures at least a zero rate of return. Other implementations, however, could guarantee an amount that is greater than the initial investment, thereby providing a greater rate of return.

1. Stored Information

The computer system implementing the present invention receives and stores various data for each investment account. In this example embodiment, the computer system receives and stores a rate of return associated with the Secure Account investment vehicle for each of the seven years of the investment. The rate of return could be the same for each year or different for each year or month, and is determined largely by the investment vehicle available in the Secure Account. The rates of return in the present example are yearly rates and are shown in box C of FIG. 3, which is an illustration of sample data used and generated by the system, method, and computer program product of the present invention.

The computer system also receives and stores an inception date and maturity date for the investment account. The inception date is the date the investment starts. The maturity date is the date on which the total value of the investment account is guaranteed to be equal to or greater than the guaranteed account value (GAV). The inception date and the maturity date are separated by the predetermined time period, which in this embodiment is seven years. In this example, the inception date is Jun. 17, 2001 and the maturity date is Jun. 17, 2008 as shown in box A of FIG. 3.

The computer system also stores the GAV that is due the investor at the end of the predetermined time period (i.e., on the maturity date). In one investment account example, the GAV is $250,000.00 as shown box A of FIG. 3. The GAV in this example embodiment is the same as the investor's principal, which results in an effective rate of return of zero percent. However, it will be evident to one skilled in the art that the GAV could be greater than or less than the initial investment, which means that the investment would provide a minimum guaranteed rate of return that is greater than zero percent (e.g., 2%, 3%, 5%, or 10%) or negative (e.g., not less than −1%, −2%, or −3%).

The computer system also receives and stores information relating to the investor's investment, such as the initial allocation of the invested assets. In the example embodiment, the computer system receives and stores the quantity of assets to be allocated to the Secure Account, if any. While the investor may elect to allocate a portion of the principal to the Secure Account, the investment is preferably designed to allow the investor to allocate all of the principal to the Variable Account. Thus, in contrast to traditional diversification, no portion of the initial investment need be initially placed in an investment yielding a low rate of return. In addition, if the investments of the Variable Account perform well (e.g., provide a consistent rate of return that is at least equal to the rate of return of the Secure Account investment), assets may never need to be reallocated to the Secure Account.

In this example embodiment, all allocations to the Secure Account, whether they are made initially by the investor or subsequently by the computer program, are automatically allocated to the single Secure Account investment vehicle. Alternate embodiments of the present invention could include additional investment vehicles in the Secure Account with differing rates. For example, in addition to a Secure Account investment vehicle with a fixed yearly rate of return (e.g., 5%), the Secure Account could include an investment having a minimum guaranteed rate of return (e.g., 3%) that also has higher anticipated rate of return (e.g., 7%).

The computer system also receives and stores data relating to the assets initially allocated to the Variable Account. Specifically, the computer system receives and stores the assets allocated to each individual investment in the Variable Account. For example, for a mutual fund investment, such as in the present example embodiment, the computer system stores the information sufficient to identify the mutual fund (e.g., the fund symbol), the units (e.g., the number of shares) of the mutual fund, and the value per unit (e.g., the share price or unit price (which may include a daily reduction in value for deducted charges in a separate account)) of the mutual fund. Likewise, for a stock investment the computer system stores information sufficient to identify the stock (e.g., the stock symbol), the units (e.g., the number of shares), and the value per unit (e.g., the share price) of the stock. Similar information sufficient to identify and value the investment is stored for other types of assets. This information is stored at the beginning of the investment and updated as is necessary due to reallocations, new deposits, and changes in value per unit.

Information identifying the investment, the units, and value of the initial allocations may be entered by an administrator, but is preferably received through a computer network and is the result of an electronic purchase initiated by the computer system pursuant to the allocation of the investor's initial assets.

The computer system also stores various parameters and data used in the computations to determine whether any reallocation of assets is to be performed, and if so, how much should be reallocated. Some of the parameters and data stored in the memory, which will be described in more detail below, include Dmin, Dmid, Dmax, the number investments in the Secure Account, the purchase date of the Secure Account investments, the number of investments in the Variable Account, and the present date. As will be evident from the description below, some of these values remain constant, and some are calculated, or otherwise determined, and stored each day.

2. Periodic Tasks

The following tasks are performed periodically, preferably each day, and more preferably at the end of each trading day. However, the time period could be weekly, monthly, or any other desirable time period. Performing these tasks after the close of the financial markets allows the computations to be performed without contemporaneous changes in account values.

In this example embodiment, at the end of each trading day, the computer program of the present invention determines if assets should be reallocated from the Variable Account to the Secure Account, from the Secure Account to the Variable Account, or if no reallocation is necessary. The computer program will reallocate funds from the Variable Account to the Secure Account if, at the end of a trading day, the computer program determines that the GAV would not be met if the Variable Account were to experience a first predetermined depreciation (e.g., twenty percent) during the next trading day and all of the depreciated assets of the Variable Account were reallocated to the Secure Account for the remainder of the predetermined time period. Alternately, the computer program will reallocate funds from the Secure Account to the Variable Account if the computer program determines that the GAV would still be met, even if the Variable Account were to experience a second predetermined depreciation (e.g., thirty percent) during the next trading day and all of the depreciated assets of the Variable Account were reallocated to the Secure Account for the remainder of the predetermined time period. If neither of these conditions is met, then the computer program does not reallocate assets. The range between the first and second predetermined depreciations provides a range over which the value of the account can vary without triggering an additional trade, thereby lowering the overall administrative costs of the program.

If reallocation is necessary (to either account), the computer program reallocates the assets so that the investment account value will equal the GAV at the end of the predetermined time period if the Variable Account were to experience a third predetermined depreciation (a value between the first and second predetermined depreciations) on the next trading day and all of the depreciated assets of the Variable Account were reallocated to the Secure Account for the remainder of the predetermined time period. The range between the first and third and between the second and third predetermined depreciations provides a range over which the value of the account can vary (away from the third predetermined depreciation) without triggering an additional trade, thereby lowering the overall administrative costs of the program.

Figure 2:
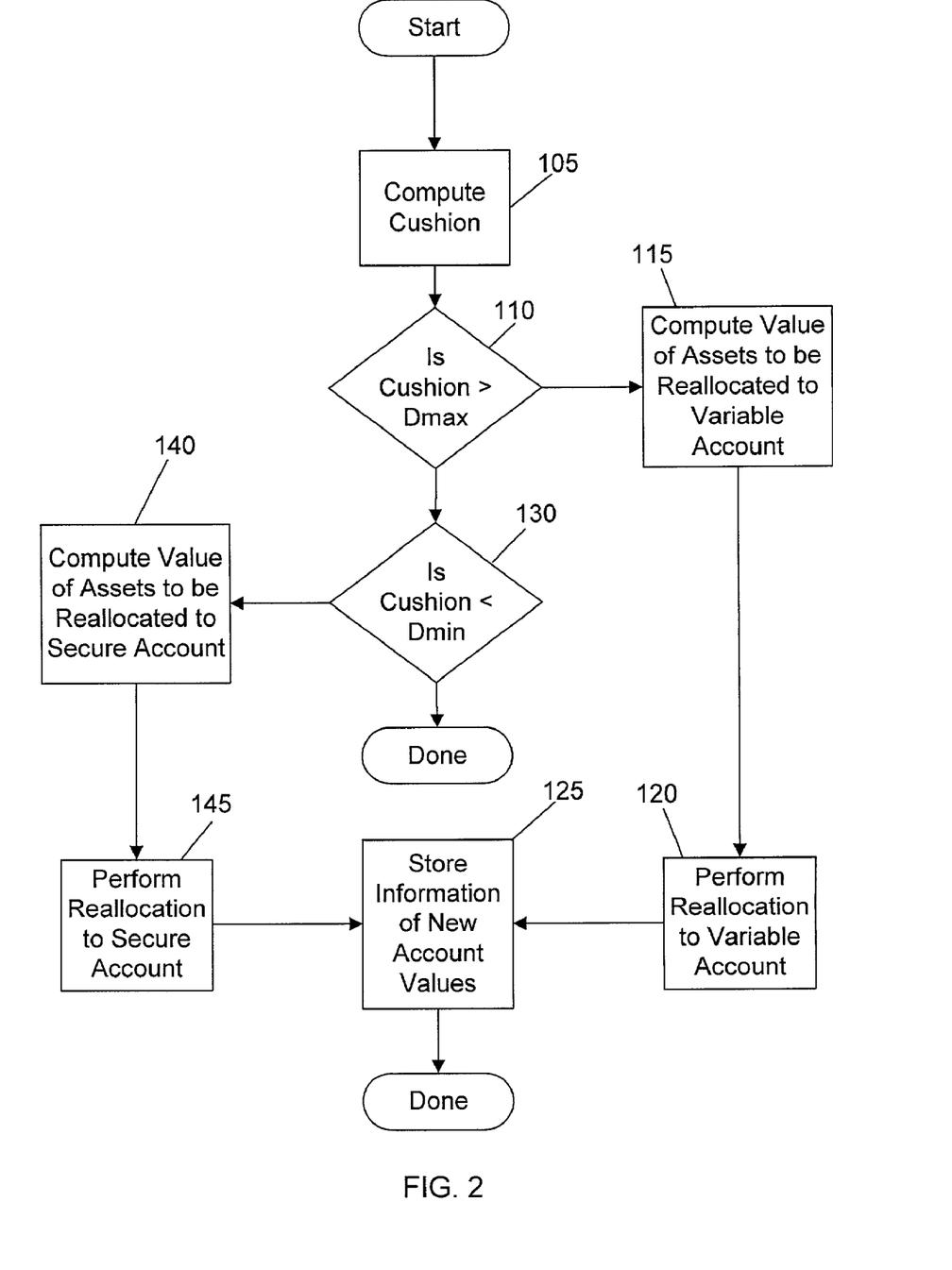
FIG. 2 is a flow diagram representing the method steps for implementing an example asset allocation in accordance with the system, method, and computer program product of the present invention for allocating assets among a plurality of investments to guarantee a predetermined value at the end of a predetermined time period.

FIG. 2 is a flow diagram representing the method steps for implementing an example asset allocation in accordance with the system, method, and computer program product of the present invention for allocating assets among a plurality of investments to guarantee a predetermined value at the end of a predetermined time period. Referring now to FIG. 2, the above described reallocation process is accomplished by first computing a Cushion (defined below) for the investment account at step 105. The Cushion is the maximum amount the Variable Account could depreciate on the next trading day and have the investment account still accumulate to the GAV at the end of the predetermined time period if all of the assets in the depreciated Variable Account were reallocated to the Secure Account for the remainder of the predetermined time period. At step 110, the Cushion is compared to a predetermined value, Dmax. If the Cushion is greater than Dmax, the value of the assets to be reallocated from the Secure Account to the Variable Account is computed at step 115. At step 120, the example embodiment of the present invention executes trades or causes them to be executed to perform the reallocation. Next, at step 125 the data relating to the value of the assets in the accounts resulting from the trades is received and/or calculated and stored in memory. If at step 110 the value of the Cushion is not greater than Dmax, the Cushion is compared to Dmin at step 130. If the value of the Cushion is not less than Dmin, no reallocation is necessary. If the value of the Cushion is less than Dmin, the value of the assets to be reallocated to the Secure Account is computed at step 140. At step 145, the example embodiment executes trades (or causes them to be executed) to carry out the calculated reallocations and, at step 125, the data relating to the value of the assets in the accounts resulting from the trades is received and/or calculated and stored in memory.

a. Computing the Cushion Value

As discussed, at the end of the each trading day, the computer program of the present invention determines if assets should be reallocated from the Variable Account to the Secure Account, from the Secure Account to the Variable Account, or if no reallocation is necessary. To make these determinations, a software module in the computer program of this example embodiment calculates a Cushion value for the investment account as shown in step 105 of FIG. 2. The Cushion calculated for an investment account is the amount the Variable Account could depreciate on the next trading day and have the investment account still accumulate to the GAV on the maturity date if all of the assets in the depreciated Variable Account were reallocated to the Secure Account. For example, a Cushion of twenty-two percent (22%) means that if the Variable Account depreciates by twenty-two percent (22%) on the next day and all the depreciated assets of the Variable Account were then reallocated to the Secure Account for the remainder of the predetermined time period, the investment account value on the maturity date would equal the GAV.

The Cushion is calculated by subtracting the Final Secure Account Value (FSAV) on the maturity date from the GAV and dividing the result by the accumulating interest factor for the remaining years. This resulting product is then divided by the current value of the Variable Account and subtracted from one to obtain the Cushion.

In essence, the calculation determines the value of the assets that would be required to be invested in the Secure Account on the next trading day to ensure that the investment account reaches the GAV on the maturity date (referred to herein as the Required Assets or RA) and divides that RA value by the current value of the Variable Account to provide a RA to Variable Account ratio.

If the resulting ratio is less than one, then the value of the Variable Account is greater than the value of assets needed to be invested in the Secure Account to accumulate to the GAV on the maturity date (i.e., greater than the RA). The resulting value is subtracted from one to provide the Cushion, which therefore indicates how much greater the value of the assets in the Variable Account are, as compared to the assets necessary to be invested in the Secure Account to accumulate to the GAV (i.e., how much greater than the RA). As discussed, the Cushion is calculated according to the following equation:

$$\text{Cushion} = 1 - (GAV - FSAV)/((1+\text{Rate})^N)/VAV$$

where:

Rate=the effective rate of return for the Secure Account for each compounding period for the remainder of the investment time period;

VAV=the current value of the assets in the variable account.

FSAV=the Final Secure Account Value on the maturity date; and

N=the number of compounding periods remaining in the investment time period.

Figure 3:
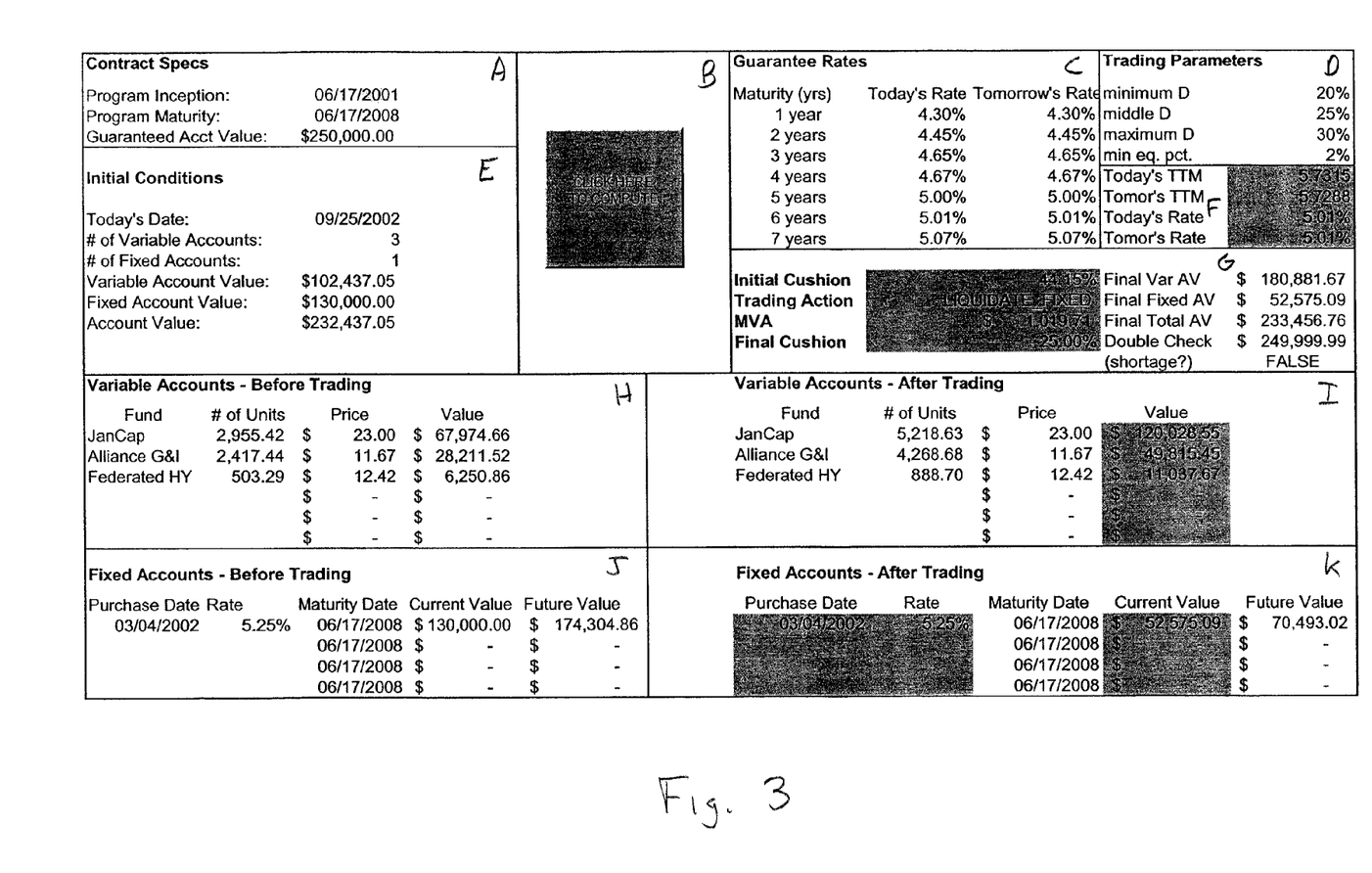
FIG. 3 is an illustration of a first set of sample data input, output, and processed by the system, method, and computer program product of the present invention.

As discussed, the available rate of return of the investment in the Secure Account changes with duration as shown in box C of FIG. 3. In order to more efficiently perform the computations in this example embodiment of the present invention, it is preferable to compute the rate of return of the investment in the Secure Account for the remainder of the time period according to the various rates (such as those in box C) and then compute an annual effective rate. For example, the rates of return in box C provide a rate of return of (1.043)*(1.0445)*(1.0465)*(1.0467)*(1.05)*(1.0501)*(1.0507), which equates to a seven year rate of return of 38.246%. The effective annual rate of return required to provide 38.246% return over seven years is 4.735%. Thus, instead of performing the calculations of this invention with each of the different rates, which would require a new calculation for each remaining year of the term of the investment, the effective annual rate can be used in the equations thereby requiring only one calculation. As will be evident to those skilled in the art, the effective annual rate will change daily, and therefore must be calculated, and preferably stored, each day.

The number of compounding periods remaining in the investment time period (N) is in units of years in this example because the rates of return compound yearly. However, other investments may compound monthly or daily.

1.) Example Data

Figure 4:
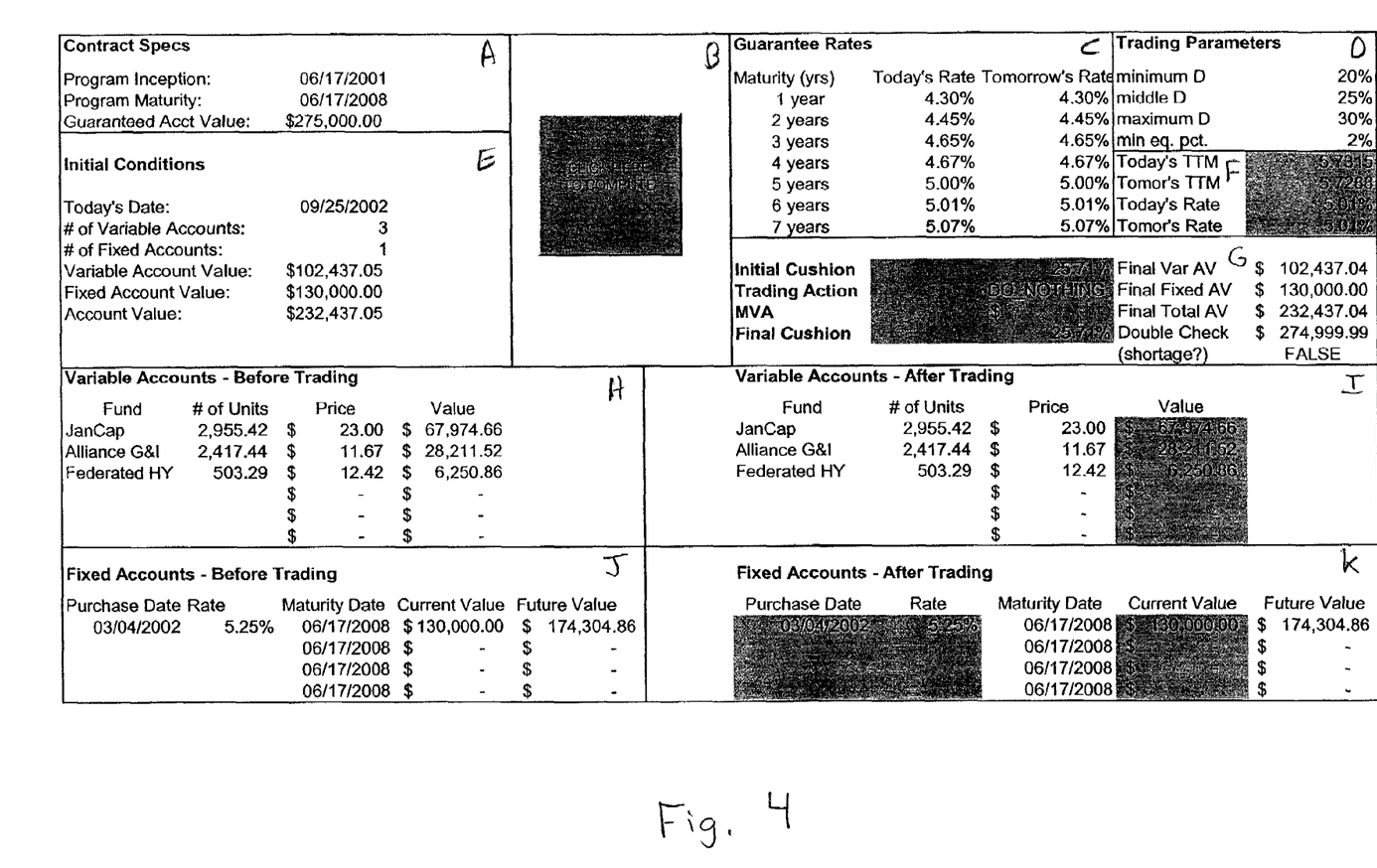
FIG. 4 is an illustration of a second set of sample data input, output, and processed by the system, method, and computer program product of the present invention.

FIGS. 3-5 each provide an illustration of a set of sample data input, output, and processed by the system, method, and computer program product of the present invention for an example investment account. The data for each example investment account is the same except that the GAV, and therefore the calculated Cushion and amounts to be reallocated, are different for each investment account. FIGS. 3-5 are the output of a spreadsheet program and source code of the Appendix designed to perform the calculations required to compute the reallocations according to this example embodiment.

As shown in box A of FIG. 3, the investment account in this example embodiment has a GAV of $250,000 with an inception date of Jun. 17, 2001, and a maturity date of Jun. 17, 2008. Referring to box E of FIG. 3, the date on which the following computations are being performed is Sep. 25, 2002. In addition, the current value of the Secure Account is $130,000 and the current value of the Variable Account is $102,437.05. There is currently one Secure Account investment and three Variable Account investments as indicated in box E. References to "Fixed Account" in the figures should be understood to mean "Secure Account" as described above.

Referring to box H of FIG. 3, the investments held in the Variable Account by this investor at the beginning of this trading day include:

2,955.42 shares of JanCap, priced at $23.00 per share, valued at $67,974.66;

2,417.44 shares of Alliance G&I, priced at $11.67 per share, valued at $28,211,52; and 503.29 shares of Federated HY, priced at $12.42 per share, valued at $6,250.86.

Finally, box D of FIG. 3 show the values for Dmin, Dmid, and Dmax, which are 20%, 25%, and 30%, respectively.

The final value of the Secure Account, which is the value the assets in the Secure Account will have accumulated to on the maturity date (hereinafter referred to as the Final Secure Account Value or FSAV) is also stored in memory. Because the rate of return for the Secure Account, the quantity of assets, and duration (time from purchase date to maturity date) are known and stored in the computer system, the final value of the Secure Account is easily calculated using an algorithm well-known in the art. The rates of return shown in box C of FIG. 3 may be used to calculate the final value of $130,000 shown in box J. Because the rate of return for the Secure Account investment in this example embodiment is fixed yearly, it is preferable to calculate the FSAV and store the value in memory as opposed to computing it daily. The FSAV previously calculated by the computer program and stored in memory is $174,304.86 as shown in block J of FIG. 3. As will be discussed in more detail below, an FSAV is calculated and stored for each new reallocation to the Secure Account.

FIGS. 4 and 5 include the same data except that the GAV in FIG. 4 is $275,000 and the GAV in FIG. 5 is $300,000.

To compute the Cushion for the investment account of FIG. 3 requires inputting the appropriate values into the above equation for computing the Cushion, which provides:

$$\text{Cushion} = 1 - (250{,}000 - 174{,}304.86)/((1+0.0501)^{5.7288}))/102{,}437.05$$

$$\text{Cushion} = 44.15\%$$

Computing the Cushion for the investment account of FIG. 4 yields a Cushion of 25.71% and the Cushion for the investment account of FIG. 5 is computed as 7.27% as shown in box G of the figures.

b Determining Whether to Reallocate Using the Cushion

The computed Cushion is compared with Dmax at step 110, which is a parameter stored in memory and may be any desirable value as described below. In this example embodiment, Dmax is set to thirty percent (30%). If the Cushion is greater than Dmax, the computer program will call a software module to calculate the value of the assets to be reallocated from the Secure Account to the Variable Account as discussed in more detail below.

The value of Dmax is selected by the designer and should be low enough so that assets are transferred to the Variable Account as much as possible (which results in an overall higher rate of return for the investment), while also being sufficiently greater than Dmin so that the number of reallocations are kept relatively low, thereby generating correspondingly low administrative costs.

The computer program may also compare the computed Cushion with Dmin at step 130, which is also stored in memory and may be any value less than Dmax. In this example embodiment, Dmin is set to twenty percent (20%). If the Cushion is less than Dmin, the computer program will use a software module to calculate the value of the assets to be reallocated from the Variable Account to the Secure Account as discussed in more detail below.

The value of Dmin could be any number appropriate for the investments in the Variable Account. Preferably, the value of Dmin is equal to, or substantially equal to, the maximum plausible one-day depreciation of the assets in the Variable Account. The value of Dmin may be a constant (e.g., twenty percent) for the Variable Account or may be computed by a statistical analysis of the historical movement of the selected investments in the Variable Account and, therefore, be dependent on the investments to which the investor allocates the Variable Account assets. The higher the Dmin, the more likely assets will be reallocated to the Secure Account, which will, in the long term, tend to diminish the overall rate of return of the investment because of the greater likelihood that assets will be allocated to Secure Accounts. Thus, it is desirable to select a Dmin value that is high enough to ensure protection of the institution offering the investment vehicle, but low enough to keep the total value of the assets reallocated, and the number of transfers to the Secure Account low, to thereby ensure higher rates of return on the investment and reduce administrative costs (such as those associated with trades effecting reallocations).

If the Cushion is less than or equal to Dmax and greater than or equal to Dmin, no reallocations are performed.

c. Reallocating from the Variable Account to the Secure Account.

If the Cushion is less than Dmin, the program must determine the value of the assets to reallocate from the Variable Account to the Secure Account. The software module of the computer program computes the value of the assets to reallocate to the Secure Account so that after the reallocation a newly computed Cushion will equal Dmid.

Dmid is still another parameter stored in the computer system and may be chosen as any value in the band between Dmin and Dmax, and preferably, near the mid point of the band. In this example embodiment Dmid is set to twenty-five percent (25%). The amount to transfer to the Secure Account may be calculated by a software module within the computer program according to the following equations:

$$Y = (GAV - Ff)/((1+Rate)^N) \quad\quad 1.$$

$$Z = Y - VAV*(1-Dmid)*((1+TRate)^{TN})/((1+Rate)^N) \quad\quad 2.$$

$$TA = Z/(1-(1-Dmid)*((1+TRate)^{TN})/((1+Rate)^N)) \quad\quad 3.$$

where:
Ff=total FSAV of all Secure Account investments on the maturity date;
Eo=total current value of the Variable Account;
Dmid=twenty-five percent (25%);
Rate=effective annual rate of return the Secure Account based on today's date;
TRate=effective annual rate of return of the Secure Account based on the next trading day's date;
N=number of compounding periods remaining in the investment time period based on today's date; and
TN=number of compounding periods remaining in the investment time period based on the next trading day's date.

From the equation 3 above, TA equals the amount to be reallocated from the Variable Account to the Secure Account. Equations 1 and 2 above are provided for convenience and for the simplification of equation 3. Once the value of the assets to be reallocated from the Variable Account investments is determined, the information is provided to a reallocation executing software module that performs the reallocations.

The software module of the computer program also calculates the new value of the Variable Account by subtracting the calculated reallocation amount from the current Variable Account value. In this example embodiment, the assets reallocated from the Variable Account investments are removed so that the proportion of each Variable Account investment remains the same after the reallocation as it was before the reallocation.

The assets reallocated to the Secure Account are deposited into a new investment in the Secure Account having a balance equal to the reallocated amount and a Purchase Date of the current day's date (i.e., the day the reallocation is performed). Other embodiments of the present invention, however, may make the deposit on the next trading day. The software module then computes the final value (i.e., the maturity date value) of the new Secure Account investment by multiplying the new investment by the accumulating interest factor $((1+Rate)^N)$ calculated with the purchase date.

Thus, each time a reallocation is made from the Variable Account to the Secure Account, a new investment in the Secure Account is created having a purchase date that is the day of the reallocation. Consequently, over time the Secure Account may accumulate a number of investments due to repeated reallocations to the Secure Account. In an alternate embodiment, instead of creating a new investment the assets reallocated to the Secure Account could be added to the present value of the existing Secure Account investment. Thus, in the alternate embodiment there would never be more than one investment in the Secure Account and a new FSAV would be calculated each time a new reallocation is made.

Finally, an optional feature of the present invention uses a Minimum Equity Percentage (MEP), which is stored in memory and that stipulates a threshold for restricting reallocations out of the Variable Account. Specifically, the computer program will not perform reallocations from the Variable Account while the value of the assets in the Variable Account is less than the MEP (e.g., two percent) of the total value of the investment account. As shown in box D of FIG. 3, the MEP of this example embodiment is two percent (2%). Reallocations from the Variable Account when the percentage of the assets in the Variable Account are very low (e.g., two percent) result in an administrative cost associated with the trade that is higher than the benefit gained to such an extent that it may be more economical to not reallocate the assets. Thus, the MEP feature eliminates reallocations having unacceptably high administrative costs in comparison to the long term increases in the value of the investment account that would result from the reallocations. However, the MEP feature would not prevent a large trade (e.g., when the Variable Account value is greater than two percent) from transferring all of the assets out of the Variable Account.

FIG. 5 illustrates an investment account in which the computer program has determined that assets should be reallocated from the Variable Account to the Secure Account because the Cushion, which was calculated as 7.27%, is less than Dmin or twenty percent (20%). Thus, the computed value of the assets to be reallocated is $72,623.16, which is shown in box K of FIG. 5 as a new Secure Account investment having a purchase date of Sep. 25, 2002.

d. Reallocating from the Secure Account to the Variable Account.

If the Cushion is greater than or equal to Dmax at step 110, assets are reallocated from the Secure Account to the Variable Account and the computer program must determine the value of the assets to reallocate at step 115. A software module of the computer program calculates the value of the assets to reallocate to the Variable Account so that after the reallocation, a newly computed Cushion will equal Dmid or twenty-five percent (25%) in this example. As discussed, a Cushion of twenty-five percent (25%) means that if the Variable Account depreciates by twenty-five percent (25%) on the next day and all the depreciated assets of the Variable Account were then reallocated to in the Secure Account for the remainder of the predetermined time period, the investment account value on the maturity date would equal the GAV.

As discussed above, the Secure Account in this embodiment may include a number of investments, which may be the result of numerous reallocations to the Secure Account. The first computation performed by this embodiment is to calculate the percentage of one of the Secure Account investments that should be reallocated to the Variable Account. The investments of the Secure Account may be selected for reallocation arbitrarily, in order of decreasing or increasing value, or in the order in which the investments were created. In this example embodiment, the investments of the Secure Account are selected in the reverse order in which they were created (i.e., last in, first out).

If the computation of the percentage (Pct) of the selected Secure Account investment that should be reallocated yields a result that is less than one hundred percent (100%), then the reallocation can be accomplished by reallocating the computed percentage of the selected Secure Account investment. If, however, the computation yields a result greater than one hundred percent (100%), then assets from additional Secure Account investments must also be reallocated. The percentage of the selected Secure Account investment that needs to reallocated to the Variable Account to achieve a Cushion of Dmid is given by the following equation:

$$Pct = \frac{(GAV - Ff - Fo - (VAV)(1 - Dmid)(1 + TRate)^{TN}))}{((SAI * R)(1 - Dmid)(1 + Rate)^N - Ff)}.$$

where:

Ff=Final Account value of the selected Secure Account investment;

Fo=total final account value of the other investments of the Secure Accounts;

VAV=current Variable Account value;

Dmid=twenty-five percent (25%);

R=ratio of market value adjustment adjusted account to current value of selected Secure Account investment (R=(Ff/(1+Rate)^N)/SAI);

Rate=effective annual rate of return of the Secure Account based on today's date;

TRate=effective annual rate of return of the Secure Account based on the date of the trading day's date;

N=number of compounding periods remaining in the investment time period based on today's date; and TN=number of compounding periods remaining in the investment time period based on the next trading day's date.

SAI=current value of the selected Secure Account investment; and

Pct=percentage of the selected Secure Account investment to reallocate.

1.) If Pct is Less Than One Hundred Percent

As discussed, if the calculated percentage (Pct) is less than one hundred percent (100%), then the calculated percentage of the selected Secure Account investment is reallocated to the Variable Account. If Pct is less than one hundred percent (100%), the amount to be reallocated from the selected Secure Account investment to the Variable Account is calculated by still another software module according to the following equation:

$$TA = (FSAI)/(1+Rate)^N * Pct$$

where:

Rate=effective annual rate of return of the Secure Account based on today's date;

N=number of compounding periods remaining in the investment time period based on today's date Pct=the percentage to be transferred as previously calculated; and FSAI=the final value of the selected Secure Account investment.

The software module also calculates and stores the new value for the selected Secure Account investment by multiplying the current value by one minus the percentage to be reallocated (1−Pct). Likewise, the software module calculates and stores the new value of the selected Secure Account investment on the maturity date (i.e., a new FSAI) by multiplying the existing FSAI by one minus the percentage to be transferred (1−Pct). In addition, the value of the assets to be reallocated (TA) are stored in memory and added to any other calculated reallocation amounts for previously selected Secure Account investments as discussed below.

FIG. 3 illustrates an investment account in which the computer program has determined that assets should be reallocated from the Secure Account to the Variable Account because the Cushion, which was calculated as 44.15%, is more than Dmax or thirty percent (30%). Thus, the value of the assets to be reallocated to the Variable Account is shown in box I of FIG. 3 as an increase in the number of shares of each mutual fund. Likewise, the reduction in the Secure Account investment is shown in box K of FIG. 3 as a new current value for Secure Account investment of $52,575.09 and new maturity date value of $70,493.02.

2.) If Pct is Greater Than One Hundred Percent

As discussed, if the calculated percentage (Pct) is greater than one hundred percent (100%), then all the assets of the selected Secure Account investment must be reallocated to the Variable Account and the computer program will select another Secure Account from which assets will be reallocated.

A software module of the computer program calculates the current value of the selected Secure Account investment (SAI), all of which will be reallocated, according to the following equation:

$$SAI = FSAI/(1+Rate)^N$$

where:

Rate=effective annual rate of return of the Secure Account based on today's date;

N=number of compounding periods remaining in the investment time period based on today's date FSAI=the final value of the selected Secure Account investment.

The value of SAI is stored in memory, subtracted from that amount needed to be allocated to the Variable Account, and another investment in the Secure Account is selected. Next, a new Pct is calculated (according to the equation for Pct above) using the newly selected Secure Account investment and using numbers in the equation that would be evident to one skilled in the art. If the value of the calculated Pct for the newly selected Secure Account investment is less than one hundred percent (100%), then the description provided above under the heading "Pct Less Than One Hundred Percent" is performed with numbers supplied in the equation that would be evident to one skilled in the art (e.g., adjusting the value of VAV by amounts already calculated to be reallocated from other Secure Account investments). If Pct is greater than one hundred percent (100%), then all the assets of the newly selected Secure Account investment must be reallocated to the Variable Account, a new Secure Account investment selected, and a new Pct calculated.

The process of selecting a Secure Account investment, calculating a corresponding Pct, and computing the amount to transfer continues until either the total amount to be reallocated is reached in the reallocation amount computations or until all the investments in the Secure Account have been liquidated. The values of the assets to be reallocated from each selected Secure Account investment are summed together and added to the Variable Account.

Once the values of the assets to reallocate from the Secure Account investments is determined, the information is provided to a reallocation executing software module that performs the reallocations. This information includes, for example, the identity of each Secure Account investment from which a reallocation is to be made and the amount of that reallocation.

3.) Market Value Adjustment

Depending on the investment(s) selected for the Secure Account, it may be desirable to calculate a Market Value Adjustment (MVA) when reallocating assets out of the Secure Account investment. In essence, upon the reallocation of assets out of a Secure Account investment, a credit or debit may be due the investment account depending on whether prevailing interest rates have increased or decreased since the purchase date of the investment. In fact, the ratio "R" described above (R=(Ff/(1+Rate)^N)/SAI) is one example of a market value adjustment. The MVA and any other desirable adjustments are made by software modules according to well-known methods and are, therefore, not provided herein.

4.) Distribution of the Reallocation to the Variable Account Investments

While the above computations have determined the value of the assets to be reallocated to the Variable Account (Assets to be Reallocated or AR), the computer program must still allocate the AR among the investments available to the Variable Account. In this example embodiment, the AR are allocated to the investments in the Variable Account in the same proportions that existing assets are held in those investments. For example, boxes H and I of FIG. 3 show the investments in the Variable Account before and after the reallocation, respectively. The percentage of the assets held in each Variable Account investment is the same before and after reallocation.

Alternate embodiments of the present invention could distribute the AR to the Variable Account investments differently. For example, the AR could be distributed to one investment, distributed evenly over the Variable Account investments, distributed in proportions that are based on the recent success of the investments, or distributed according to previously received and stored selections by the investor.

e. Executing the Reallocation

After all the computations are complete, the computer program employs a reallocation executing software module to perform the actual purchasing and selling of assets (trades) in order to carry out the reallocation process at steps 120 and 145. Preferably, the computer system implementing the present invention is coupled to a computer system (e.g., via a computer network) that executes trades of the investments in the Secure Account and Variable Account such as those listed above. For example, the computer system of the present invention may electronically transmit requests to buy or sell stocks (e.g., a market order) on the NASDAQ exchange in order to carry out reallocations. Likewise, the computer system of the present invention may electronically transmit requests to buy or sell mutual funds to the institutions managing the mutual funds or to other computer systems that can carry out the requested trades. Thus, the computer system of the present invention preferably includes the appropriate hardware and software modules for interfacing with the desired computer systems and/or networks.

Consequently, the reallocation executing software module of the computer system implementing the present invention will transmit requests to buy and sell quantities of assets and, in response to the request, receive information relating the value of the assets bought and sold such as the shares bought or sold. The received information is stored appropriately to update the information relating to the investments of the Secure Account and Variable Account. For example, the computer system may transmit a request to sell a specific value (e.g., $10,000) of a particular Variable Account investment such as a mutual fund. In response, the computer system would receive information of the number of shares sold in order to liquidate the desired value of the mutual fund. The computer program would then reduce the units (e.g., shares) of that Variable Account investment by the number of units sold and store the new number of units in memory.

The modifications of the values stored in memory of the assets in the Secure Account and Variable Accounts may be performed immediately after calculating the amounts to be reallocated and/or after receiving confirmation and/or information after the reallocation (e.g., a trade) has been completed.

Some investments, such as the Secure Account investments, may be offered by the same financial institution that is offering the investment account. For these types of investments the computer system implementing the present invention may execute the trades (or that portion of the trade) itself, through the manipulation of internal databases and other appropriate actions.

In an alternate embodiment, the computer system may produce information (e.g., display or print information) that is sufficient to enable a person to execute the appropriate trades to carry out the reallocation. The computer system would then receive information relating to the executed trades as a manual input or as an electronic data transmission as described above.

The present invention also permits the investor to transfer (reallocate) those assets in the Variable Account among the investments and/or to new investments in the Variable Account. Thus, the computer program may receive a request to sell all or portions of the investments in the Variable Account and to purchase certain investments, which, as a result of the purchase, become an investment of the Variable Account. The request is stored in memory and retrieved by the computer program, which executes the appropriate trades (as described above) to accomplish the desired transaction(s). Results of the transaction are stored in memory. As will be evident to one skilled in the art, information of the new investments held in the Variable Account are then subsequently used in the computations for determining whether reallocations should be made.

f. The Step Up Process

The investment vehicle of the present invention allows the investor to Step Up the investment account to lock in increases in value of the investment account. A Step Up restarts the investment period and establishes a new GAV equal to the current value of the assets in the investment account as of the date of the Step Up. For example, an investor may wish to Step Up the GAV if the investor's investment account experiences a thirty-five percent increase at the end of the first three years of the predetermined time period. Assuming the investment vehicle has a seven (7) year predetermined time period, and the initial deposit and GAV are one hundred thousand dollars ($100,000), the investment account would have assets valued at one hundred thirty-five thousand dollars ($135,000) at the end of the third year (resulting from the thirty-five percent increase). The investor may elect to Step Up the GAV by restarting the investment vehicle. The new investment account created by the Step Up will then provide a GAV of one hundred thirty-five thousand dollars ($135,000) at the end a new seven year period (ten years from the initial investment).

Upon receiving a request to Step Up an investment account, a software module of the computer program stores the Step Up date as the inception date and calculates and stores a new maturity date. If there are any Secure Account investments, new final and current Secure Account values and purchase dates (which would correspond to the step up date) are also calculated and/or stored as is necessary. In addition, a Step Up may require a reallocation, which would be determined and performed according the above description.

C. Other Investment Vehicles

The investment vehicle of the present invention may also be combined with other investment vehicles, such as an annuity. For example, the investment vehicle of the present invention could be used to guarantee a minimum income base (or account value), which is then paid to the investor as annuity payments beginning at the end of the predetermined time period.

In addition, if the value of the Variable Account depreciates greater than a predetermined percentage (e.g., Dmin, Dmax, Dmid, or some other percentage), the institution offering the investment product could transmit funds to the investor's account sufficient to increase the value of the investor's account to the predetermined value or percentage below the previous period's account value (e.g., Dmin, Dmax, Dmid, or some other percentage). Such a feature would provide additional security to the investor and reduce fears that an unexpected decrease in the account value that is greater than the predetermined percentage would prevent return of the GAV.

The computer program and software modules of the system, method, and computer program product of the present invention can be implemented using any operating system, and associated hardware including, but not limited to, Palm OS, Microsoft Windows CE, Unix, Linux, VMS, IBM, Microsoft Windows NT, 95, 98, 2000, ME, and XP, and the like.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

For example, while the above example uses the equations above for determining whether a reallocation is necessary, other embodiments could employ other equations or other equations and reiterative processes to determine whether the GAV would be met. More specifically, using the Dmin and Dmax of the above example, instead of calculating a Cushion, an alternate embodiment could calculate a twenty percent (Dmin) depreciation of the assets in the Variable Account and then determine if the GAV would be met if the depreciated assets of the Variable Account were invested in the Secure Account. If the GAV would not be met, the computer program of the alternate embodiment would then compute the value of the assets to be reallocated from the Variable Account to the Secure Account in any suitable method such as the one described in the first example embodiment.

If the GAV would be met, the alternate embodiment would then calculate a thirty percent (Dmax) depreciation of the assets in the Variable Account and then determine if the GAV would be reached if the depreciated assets of the Variable Account were invested in the Secure Account. If the GAV would still be met, the computer program of the alternate embodiment would then compute the value of the assets to be reallocated from the Secure Account to the Variable Account in any suitable method such as the one described in the first example embodiment. If the GAV would not be met, no reallocation would be necessary.

Obviously, numerous modifications and variations of the present invention are possible in light of the above teachings. It is therefore to be understood that within the scope of the appended claims, the invention may be practiced otherwise than as specifically described herein.

What is claimed is:

1. A computerized investment system for managing investment allocation for an investment account, with an investor having control in selecting one or more variable investments for the investment account, the investment account having a guaranteed rate of return, the investor entitled to a guaranteed value based on a calculation using the guaranteed rate of return, the system comprising:

one or more computer processors;

one or more tangible computer-readable storage media;
computer software stored on the one or more tangible computer-readable storage media and operable, when executed by the one or more computer processors, to:
receive data representing a first account value of the investment account;
calculate the guaranteed value based at least in part on the data representing the first account value and the guaranteed rate of return, the guaranteed rate of return providing that an account value of the investment account will be greater than or equal to the guaranteed value at the end of a predetermined time period regardless of market performance of the investment account, the guaranteed rate of return being greater than or equal to zero;
receive data representing a request of the investor to allocate a percentage of the investment account to a variable investment selected by the investor from among a plurality of variable investments;
in response to the received request data, allocate a percentage of the investment account to the variable investment selected by the investor;
periodically determine whether the account value of the investment account would accumulate to at least the guaranteed value at the end of the predetermined time period if the account value was reduced by a predetermined percentage and reallocated to the secure investment for the remainder of the predetermined time period; and
automatically reallocate a percentage of the investment account from the variable investment selected by the investor to a secure investment, the automatic reallocation reducing the risk associated with providing the guaranteed rate of return, the automatic reallocation in response to a determination that, based on market performance of the investment account, the account value of the investment account would not accumulate to at least the guaranteed value at the end of the predetermined time period if the account value was reduced by the predetermined percentage and reallocated to the secure investment for the remainder of the predetermined time period.

2. The system of claim 1, wherein the computer software is further operable, when executed by the one or more computer processors, to:
automatically reallocate a second percentage of the investment account from the secure investment to the variable investment selected by the investor, such that the account value of the investment account would accumulate to at least the guaranteed value at the end of the predetermined time period if the value of the investment account was reduced by the predetermined percentage, the automatic reallocation to the secure account in response to a determination that, based on market performance of the investment account, the account value of the investment account would accumulate to at least the guaranteed value at the end of the predetermined time period if the account value was reduced by the predetermined percentage and reallocated to the secure investment for the remainder of the predetermined time period.

3. The system of claim 1, wherein the predetermined time period is a fixed number of years.

4. The system of claim 1, wherein the secure account comprises an amount, as a result of the automatic reallocation, such that the account value of the investment account would accumulate to at least the guaranteed value at the end of the predetermined time period if the value of the investment account was reduced by the predetermined percentage.

5. The system of claim 1, wherein the guaranteed rate of return is a positive rate of return.

6. The system of claim 1, wherein the guaranteed rate of return is an annual rate of return in the range from zero to 10%.

7. The system of claim 1, wherein the first guaranteed rate of return is an annual rate of return in the range from 2% to 10%.

8. The system of claim 1, wherein during the predetermined time period, the system enables the investor to elect to receive a new guarantee based upon the present account value, wherein the new guarantee provides a new guaranteed rate of return on the present account value; and
wherein the computer software is further operable, when executed by the one or more computer processors, to recalculate the guaranteed value based at least in part on the present account value and the new guaranteed rate of turn on the present account value.

9. The system of claim 1, wherein the computer software is further operable, when executed by the one or more computer processors, to:
allocate a percentage of the investment account to a plurality of variable investments selected by the investor; and
in response to market performance of the plurality of variable investments selected by the investor, automatically reallocate percentages of the account value from multiple ones of the plurality of variable investments selected by the investor to the secure account.

10. The system of claim 1, wherein the percentage of the investment account allocated to the variable investment selected by the investor is 100% of the first account value of the investment account.

11. A computer program for managing investment allocation for an investment account, with an investor having control in selecting one or more variable investments for the investment account, the computer program embodied on one or more tangible computer-readable media, the investment account having a guaranteed rate of return, the investor entitled to a guaranteed value based on a calculation using the guaranteed rate of return, the computer program comprising:
a computer code segment which, when executed by a computer system, receives data representing a first account value of the investment account;
a computer code segment which, when executed by a computer system, calculates the guaranteed value based at least in part on the data representing the first account value and the guaranteed rate of return, the guaranteed rate of return providing that an account value of the investment account will be greater than or equal to the guaranteed value at the end of a predetermined time period regardless of market performance of the investment account, the guaranteed rate of return being greater than or equal to zero;
a computer code segment which, when executed by a computer system, receives data representing a request of the investor to allocate a percentage of the investment account to a variable investment selected by the investor from among a plurality of variable investments;
a computer code segment which, when executed by a computer system, responds to the received request data by allocating a percentage of the investment account to the variable investment selected by the investor;
a computer code segment which, when executed by a computer system, periodically determines whether the account value of the investment account would accumulate to at least the guaranteed value at the end of the predetermined time period if the account value was reduced by a predetermined percentage and reallocated to the secure investment for the remainder of the predetermined time period; and a computer code segment which, when executed by a computer system, automatically reallocates a percentage of the investment account from the variable investment selected by the investor to a secure investment, the automatic reallocation reducing the risk associated with providing the guaranteed rate of return, the automatic reallocation in response to a determination that, based on market performance of the investment account, the account value of the investment account would not accumulate to at least the guaranteed value at the end of the predetermined time period if the account value was reduced by the predetermined percentage and reallocated to the secure investment for the remainder of the predetermined time period.

12. The computer program of claim 11, further comprising a computer code segment which, when executed by a computer system, automatically reallocates a second percentage of the investment account from the secure investment to the variable investment selected by the investor, such that the account value of the investment account would accumulate to at least the guaranteed value at the end of the predetermined time period if the value of the investment account was reduced by the predetermined percentage, the automatic reallocation to the secure account in response to a determination that, based on market performance of the investment account, the account value of the investment account would accumulate to at least the guaranteed value at the end of the predetermined time period if the account value was reduced by the predetermined percentage and reallocated to the secure investment for the remainder of the predetermined time period.

13. The computer program of claim 11, wherein the predetermined time period is a fixed number of years.

14. The computer program of claim 11, wherein the secure account comprises an amount, as a result of the automatic reallocation, such that the account value of the investment account would accumulate to at least the guaranteed value at the end of the predetermined time period if the value of the investment account was reduced by the predetermined percentage.

15. The computer program of claim 11, wherein the guaranteed rate of return is a positive rate of return.

16. The computer program of claim 11, wherein the guaranteed rate of return is an annual rate of return in the range from zero to 10%.

17. The computer program of claim 11, wherein the first guaranteed rate of return is an annual rate of return in the range from 2% to 10%.

18. The computer program of claim 11, further comprising:
a computer code segment which, when executed by a computer system, processes an election by the investor to receive a new guarantee based upon the present account value, wherein the new guarantee provides a new guaranteed rate of return on the present account value; and a computer code segment which, when executed by a computer system, recalculates the guaranteed value based at least in part on the present account value and the new guaranteed rate of turn on the present account value.

19. The computer program of claim 11, further comprising:
a computer code segment which, when executed by a computer system, allocates a percentage of the investment account to a plurality of variable investments selected by the investor; and a computer code segment which, when executed by a computer system, automatically reallocates percentages of the account value from multiple ones of the plurality of variable investments selected by the investor to the secure account, in response to market performance of the plurality of variable investments selected by the investor.

20. The computer program of claim 11, wherein the percentage of the investment account allocated to the variable investment selected by the investor is 100% of the first account value of the investment account.

21. A method for managing investment allocation for an investment account, with an investor having control in selecting one or more variable investments for the investment account, the investment account having a guaranteed rate of return, the investor entitled to a guaranteed value based on a calculation using the guaranteed rate of return, the method comprising:

receiving, at a computer system, data representing a first account value of the investment account, wherein the computer system comprises one or more computer processors and one or more tangible computer-readable storage media communicatively coupled to said one or more computer processors;

calculating, by the computer system, the guaranteed value based at least in part on the data representing the first account value and the guaranteed rate of return, the guaranteed rate of return providing that an account value of the investment account will be greater than or equal to the guaranteed value at the end of a predetermined time period regardless of market performance of the investment account, the guaranteed rate of return being greater than or equal to zero;

receiving, at the computer system, data representing a request of the investor to allocate a percentage of the investment account to a variable investment selected by the investor from among a plurality of variable investments;

in response to the received request data, allocating, by the computer system, a percentage of the investment account to the variable investment selected by the investor;

periodically determine, by the computer system, whether the account value of the investment account would accumulate to at least the guaranteed value at the end of the predetermined time period if the account value was reduced by a predetermined percentage and reallocated to the secure investment for the remainder of the predetermined time period; and automatically reallocate, by the computer system, a percentage of the investment account from the variable investment selected by the investor to a secure investment, such that the account value of the investment account would accumulate to at least the guaranteed value at the end of the predetermined time period if the value of the investment account was reduced by the predetermined percentage, the automatic reallocation reducing the risk associated with providing the guaranteed rate of return, the automatic reallocation in response to a determination that, based on market performance of the investment account, the account value of the investment account would not accumulate to at least the guaranteed value at the end of the predetermined time period if the account value was reduced by the predetermined percentage and reallocated to the secure investment for the remainder of the predetermined time period.

22. The method of claim 21, further comprising automatically reallocating a second percentage of the investment account from the secure investment to the variable investment selected by the investor, such that the account value of the investment account would accumulate to at least the guaranteed value at the end of the predetermined time period if the value of the investment account was reduced by the predetermined percentage, the automatic reallocation to the secure account in response to a determination that, based on market performance of the investment account, the account value of the investment account would accumulate to at least the guaranteed value at the end of the predetermined time period if the account value was reduced by the predetermined percentage and reallocated to the secure investment for the remainder of the predetermined time period.

23. The method of claim 21, wherein the predetermined time period is a fixed number of years.

24. The method of claim 21, wherein the secure account comprises an amount, as a result of the automatic reallocation, such that the account value of the investment account would accumulate to at least the guaranteed value at the end of the predetermined time period if the value of the investment account was reduced by the predetermined percentage.

25. The method of claim 21, wherein the guaranteed rate of return is a positive rate of return.

26. The method of claim 21, wherein the guaranteed rate of return is an annual rate of return in the range from zero to 10%.

27. The method of claim 21, wherein the first guaranteed rate of return is an annual rate of return in the range from 2% to 10%.

28. The method of claim 21, further comprising:
processing, by the computer system, during the predetermined time period an election of the investor to receive a new guarantee based upon the present account value, wherein the new guarantee provides a new guaranteed rate of return on the present account value; and
recalculating, by the computer system, the guaranteed value based at least in part on the present account value and the new guaranteed rate of turn on the present account value.

29. The method of claim 21, further comprising:
allocating a percentage of the investment account to a plurality of variable investments selected by the investor; and
in response to market performance of the plurality of variable investments selected by the investor, automatically reallocating percentages of the account value from multiple ones of the plurality of variable investments selected by the investor to the secure account.

30. The method of claim 21, wherein the percentage of the investment account allocated to the variable investment selected by the investor is 100% of the first account value of the investment account.

\* \* \* \* \*